US012587963B2

(12) United States Patent
Pochiraju et al.

(10) Patent No.: US 12,587,963 B2
(45) Date of Patent: Mar. 24, 2026

(54) DEVICE, METHOD, AND SYSTEM FOR CHANNEL SWITCHING

(71) Applicant: NXP USA, Inc., Austin, TX (US)

(72) Inventors: Sri Anand Sesha Krishna Pochiraju, Sunnyvale, CA (US); Sagar Ashok Tamhane, Fremont, CA (US); Po Wei Tan, San Jose, CA (US); Liwen Chu, San Ramon, CA (US); Manish Kumar, Clarksburg, MD (US); Rui Cao, Sunnyvale, CA (US); Hongyuan Zhang, Fremont, CA (US)

(73) Assignee: NXP USA, Inc., Austin, TX (US)

( * ) Notice: Subject to any disclaimer, the term of this patent is extended or adjusted under 35 U.S.C. 154(b) by 414 days.

(21) Appl. No.: 18/099,906

(22) Filed: Jan. 20, 2023

(65) Prior Publication Data

US 2024/0251346 A1 Jul. 25, 2024

(51) Int. Cl.
H04W 52/02 (2009.01)
H04W 36/34 (2009.01)

(52) U.S. Cl.
CPC ....... H04W 52/0216 (2013.01); H04W 36/34 (2013.01)

(58) Field of Classification Search
CPC . H04W 52/0216; H04W 36/34; H04W 36/06; H04W 84/12; H04W 28/20
See application file for complete search history.

(56) References Cited

U.S. PATENT DOCUMENTS

| | | | |
|---|---|---|---|
| 10,716,066 B2 | 7/2020 | Huang et al. | |
| 2016/0219522 A1 | 7/2016 | Asterjadhi et al. | |
| 2019/0246354 A1* | 8/2019 | Huang | H04W 52/0229 |
| 2019/0253967 A1* | 8/2019 | Xiao | H04W 28/0284 |
| 2022/0264429 A1 | 8/2022 | Gan et al. | |
| 2023/0073868 A1* | 3/2023 | Nayak | H04W 52/0216 |
| 2023/0262768 A1* | 8/2023 | Ko | H04W 76/15 |
| 2023/0319711 A1* | 10/2023 | Uppala | H04W 52/0216 |
| | | | 370/311 |
| 2024/0334468 A1* | 10/2024 | Shinohara | H04W 76/20 |
| 2025/0175958 A1* | 5/2025 | Cao | H04W 72/231 |

FOREIGN PATENT DOCUMENTS

| | | |
|---|---|---|
| CN | 111194063 A | 5/2020 |
| CN | 113541896 A | 10/2021 |

OTHER PUBLICATIONS

IEEE, "IEEE P802.11ax™/D6.0, Draft Standard for Information technology—Telecommunications and information exchange between systems Local and metropolitan area networks", IEEE P802.11ax™/ D6.0, Nov. 2019, 780 pgs.

(Continued)

*Primary Examiner* — Mohammed S Chowdhury

(57) ABSTRACT

Embodiments of a device, a method, and a system for channel switching are disclosed. In an embodiment, the device includes a wireless network interface device implemented on one or more integrated circuits (ICs), where the wireless network interface device is configured to negotiate a Target Wake Time (TWT) of a first Device Under Test (DUT) (DUT1) and a TWT of a second DUT (DUT2), and switch channels between DUT1 and DUT2 according to the negotiated TWT of DUT1 and the negotiated TWT of DUT2.

19 Claims, 7 Drawing Sheets

300

(56) References Cited

OTHER PUBLICATIONS

IEEE Draft Standard for Information technology—Telecommunications and information exchange between systems Local and metropolitan area networks—Specific requirements Part 11: Wireless LAN Medium Access Control (MAC) and Physical Layer (PHY) Specifications Amendment 1: Enhancements for High Efficiency WLAN, in IEEE P802.11ax/O8.0, Oct. 2020 (approved draft); Nov. 3, 2020 26.14.1 Intra-PPDU power save for non-AP HE STAs; 6 pages.

IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications, in IEEE Std 802.11-2020 (Revision of IEEE Std 802.11-2016); Feb. 26, 2021, doi: 10.1109/IEEESTD.2021.9363693._11.26_SM_power_save: 84 pgs.

U.S. Appl. No. 18/447,173, filed Aug. 9, 2023; 82 pages.

U.S. Appl. No. 18/447,173; Non-Final Office Action Sep. 10, 2025; 15 pages.

U.S. Appl. No. 18/447,173; Notice of Allowance mailed Jan. 14, 2026; 10 pages.

\* cited by examiner

502

A DEVICE NEGOTIATES A TARGET WAKE TIME (TWT) OF A FIRST DEVICE UNDER TEST (DUT) (DUT1) AND A TWT OF A SECOND DUT (DUT2)

504

THE DEVICE SWITCHES CHANNELS BETWEEN DUT1 AND DUT2 ACCORDING TO THE NEGOTIATED TWT OF DUT1 AND THE NEGOTIATED OF DUT2

DEVICE, METHOD, AND SYSTEM FOR CHANNEL SWITCHING

BACKGROUND

In wireless communications, wireless devices can execute various operations, such as transmission and reception of frames via one or more channels. As an example, a wireless device with a first Device Under Test (DUT), DUT1, and a second DUT, DUT2, may exchange frames using a DUT1 channel and a DUT2 channel. Because the wireless device cannot exchange frames on the DUT1 channel and the DUT2 channel simultaneously, the wireless device may perform channel switches. Consequently, conventional techniques for channel switching may involve a handshake at DUT1 and at DUT2 after each channel switch. As such, conventional channel switching techniques may increase overhead and limit efficiency in wireless communications.

SUMMARY

Embodiments of a device, a method, and a system for channel switching are disclosed. In an embodiment, the device includes a wireless network interface device implemented on one or more integrated circuits (ICs), where the wireless network interface device is configured to negotiate a Target Wake Time (TWT) of a first Device Under Test (DUT) (DUT1) and a TWT of a second DUT (DUT2), and switch channels between DUT1 and DUT2 according to the negotiated TWT of DUT1 and the negotiated TWT of DUT2.

In an embodiment, a DUT1 TWT wake interval of the negotiated TWT of DUT1 and a DUT2 TWT wake interval of the negotiated TWT of DUT2 do not overlap.

In an embodiment, switching the channels between DUT1 and DUT2 involves switching the channels between a DUT1 TWT wake interval of the negotiated TWT of DUT1 and a DUT2 TWT wake interval of the negotiated TWT of DUT2.

In an embodiment, switching the channels between DUT1 and DUT2 involves switching from a DUT1 channel to a DUT2 channel, where DUT1 exchanges frames on the DUT1 channel according to the negotiated TWT of DUT1, and where DUT2 exchanges frames on the DUT2 channel according to the negotiated TWT of DUT2.

In an embodiment, switching the channels between DUT1 and DUT2 involves switching from a DUT2 channel to a DUT1 channel, where DUT1 exchanges frames on the DUT1 channel according to the negotiated TWT of DUT1, and where DUT2 exchanges frames on the DUT2 channel according to the negotiated TWT of DUT2.

In an embodiment, switching the channels between DUT1 and DUT2 involves switching between channels in a same band.

In an embodiment, switching the channels between DUT1 and DUT2 involves switching between channels in different bands.

In an embodiment, a data transmission pause occurs before switching the channels between DUT1 and DUT2.

In an embodiment, DUT1 exchanges frames on a DUT1 channel with an external station (STA) (Ext-STA) according to the negotiated TWT of DUT1, and DUT2 exchanges frames on a DUT2 channel with an external access point (AP) (Ext-AP) according to the negotiated TWT of DUT2.

In an embodiment, DUT1 exchanges frames on a DUT1 channel with a first Ext-STA (Ext-STA1) according to the negotiated TWT of DUT1, and DUT2 exchanges frames on a DUT2 channel with a second Ext-STA (Ext-STA2) according to the negotiated TWT of DUT2.

In an embodiment, DUT1 is a DUT soft AP (uAP) (DUT-uAP), and DUT2 is a DUT STA (DUT-STA).

In an embodiment, DUT1 is a first DUT-STA (DUT-STA1), and DUT2 is a second DUT-STA (DUT-STA2).

In an embodiment, DUT1 is a first DUT-uAP (DUT-uAP1), and DUT2 is a second DUT-uAP (DUT-uAP2).

In an embodiment, at least one of DUT-uAP1 and DUT-uAP2 allocate a period of time within a beacon interval for STA association.

In an embodiment, the period of time is at least one of announced by a beacon, after a beacon transmission with an interval of at least one beacon interval, and defined by a TWT agreement.

In an embodiment, DUT1 is a DUT-uAP, and where negotiating the TWT of DUT1 includes receiving a TWT request message indicating requested TWT parameters, determining whether to accept the requested TWT parameters, and transmitting a TWT response message indicating whether the requested TWT parameters were accepted.

In an embodiment, DUT2 is a DUT-STA, and where negotiating the TWT of DUT2 includes transmitting a TWT request message indicating requested TWT parameters, and receiving a TWT response message indicating whether the requested TWT parameters were accepted.

In an embodiment, the negotiated TWT of DUT1 and the negotiated TWT of DUT2 are at least one of an individual TWT (I-TWT), a broadcast TWT (B-TWT), and a restricted TWT (R-TWT).

A method for channel switching is also disclosed. In an embodiment, the method includes negotiating a TWT of a DUT1 and a TWT of a DUT2, and switching channels between DUT1 and DUT2 according to the negotiated TWT of DUT1 and the negotiated TWT of DUT2.

A system for channel switching is also disclosed. In an embodiment, the system includes a DUT1 configured to negotiate a TWT of DUT1, a DUT2 configured to negotiate a TWT of DUT2, and where channel switching between DUT1 and DUT2 occurs according to the negotiated TWT of DUT1 and the negotiated TWT of DUT2.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
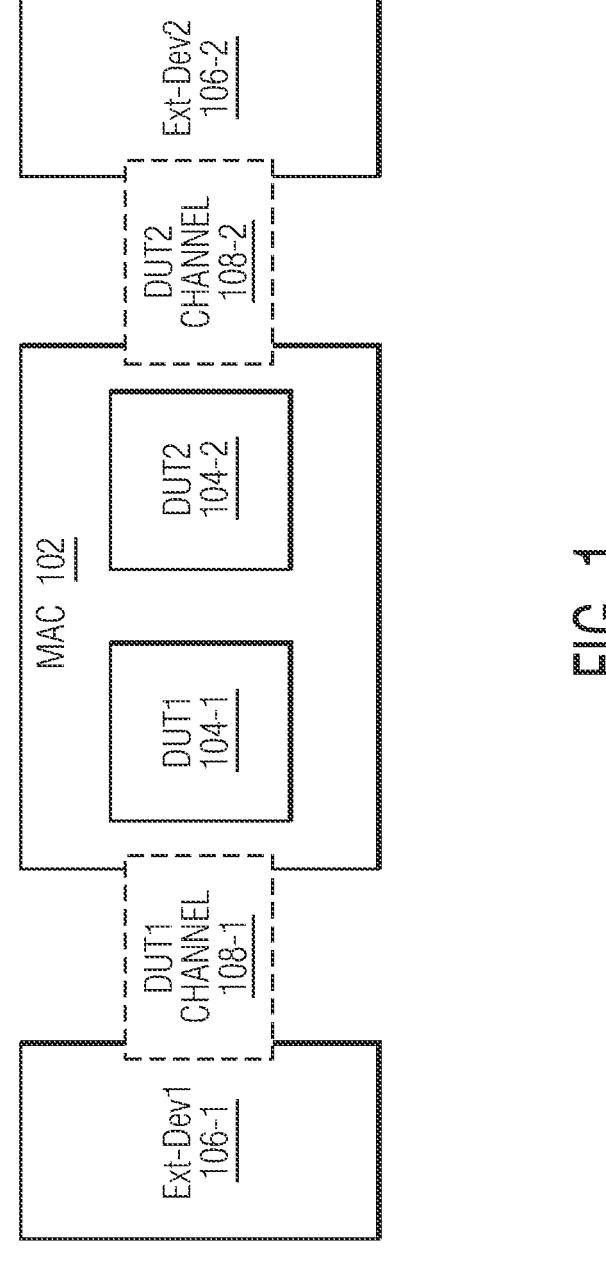
FIG. 1 depicts a wireless communications system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In embodiments of a wireless communications system, a Device Under Test (DUT) soft access point (uAP) (DUT-uAP) and a DUT station (STA) (DUT-STA) acting on a singular Media Access Control (MAC) device, may exchange frames with external devices (e.g., an external STA (Ext-STA) and an external access point (AP) (Ext-AP)). The singular MAC device may be configured to operate with associated Ext-uAPs and Ext-STAs according to a communication protocol. For example, the communication protocol may be an Extremely High Throughput (EHT) communication protocol, or Institute of Electrical and Electronics Engineers (IEEE) 802.11be communication protocol. Features of wireless communications systems operating in accordance with the EHT communication protocol and/or next-generation communication protocols may be referred to herein as "non-legacy" features. In some embodiments of the wireless communications system described herein, different associated Ext-uAPs and Ext-STAs within range of a singular MAC device operating according to the EHT communication protocol are configured to operate according to at least one other communication protocol, which defines operation in a Basic Service Set (BSS) with the singular MAC device, but are generally affiliated with lower data throughput protocols. The lower data throughput communication protocols (e.g., High Efficiency (HE) communication protocol, Very High Throughput (VHT) communication protocol, etc.) may be collectively referred to herein as "legacy" communication protocols.

FIG. 1 depicts a wireless communications system 100 that is used for wireless (e.g., Wi-Fi) communications. In the embodiment depicted in FIG. 1, the wireless communications system includes a singular MAC device, implemented as MAC 102, and two external devices, implemented as Ext-Dev1 106-1 and Ext-Dev2 106-2. The wireless communications system can be used in various applications, such as industrial applications, medical applications, computer applications, and/or consumer or enterprise applications. In some embodiments, the wireless communications system may be a wireless communications system compatible with an IEEE 802.11 protocol (e.g., the IEEE 802.11be protocol). Although the depicted wireless communications system 100 is shown in FIG. 1 with certain components and described with certain functionality herein, other embodiments of the wireless communications system may include fewer or more components to implement the same, less, or more functionality. Additionally, although the wireless communications system is shown in FIG. 1 as being connected in a certain topology, the network topology of the wireless communications system is not limited to the topology shown in FIG. 1.

In the embodiment depicted in FIG. 1, the MAC 102 includes a first DUT, DUT1 104-1, and a second DUT, DUT2 104-2. In one embodiment, DUT1 104-1 is a DUT-uAP, and DUT2 104-2 is a DUT-STA. In another embodiment, DUT1 104-1 is a first DUT-uAP, and DUT2 104-2 is a second DUT-uAP. The DUTs 104-1 and 104-2 may be implemented in hardware (e.g., circuits), software, firmware, or a combination thereof. The DUTs 104-1 and 104-2 may be fully or partially implemented as an integrated circuit (IC) device, such that the MAC 102 includes a wireless network interface implemented on one more ICs. In some embodiments, the DUTs 104-1 and 104-2 may be compatible with at least one wireless local area network (WLAN) communications protocol (e.g., at least one IEEE 802.11 protocol). For example, the DUTs 104-1 and 104-2 may be compatible with the IEEE 802.11be protocol.

In some embodiments, the MAC 102 connects to a Local Area Network (LAN) and/or to a backbone network (e.g., the Internet) through a wired or wireless connection and wirelessly connects to Ext-Dev1 106-1 and/or Ext-Dev2 106-2, for example, through one or more WLAN communications protocols, such as the IEEE 802.11 protocol. In some embodiments, the MAC 102 includes at least one antenna, at least one transceiver operably connected to the at least one antenna, and at least one controller operably connected to the corresponding transceiver. In some embodiments, the at least one transceiver includes a physical layer (PHY) device. The at least one controller may be configured to control the at least one transceiver to process received packets through the at least one antenna. In some embodiments, the at least one controller may be implemented within a processor, such as a microcontroller, a host processor, a host, a digital signal processor (DSP), or a central processing unit (CPU), which can be integrated in a corresponding transceiver. In some embodiments, the DUTs 104-1 and 104-2 may operate in different BSS operating channels. For example, DUT1 104-1 may operate in a 320 megahertz (MHz) BSS operating channel at a 6 gigahertz (GHz) band, and DUT2 104-2 may operate in a 160 MHz BSS operating channel at a 5 GHz band. Although the MAC 102 is shown in FIG. 1 as including two DUTs, other embodiments of the MAC 102 may include more than two DUTs or less than two DUTs.

In the embodiment depicted in FIG. 1, Ext-Dev1 106-1 and Ext-Dev2 106-2 may be communications devices (e.g., Ext-APs and/or Ext-STAs) that wirelessly connect to the MAC 102. For example, Ext-Dev1 106-1 and Ext-Dev2 106-2 are communications devices compatible with at least one IEEE 802.11 protocol (e.g., the IEEE 802.11be protocol). In some embodiments, each Ext-Dev includes at least one antenna, at least one transceiver operably connected to the at least one antenna, and at least one controller connected to the corresponding transceiver. In some embodiments, the at least one transceiver includes a PHY device. The at least one controller may be configured to control the at least one transceiver to process received packets through the at least one antenna. In some embodiments, the at least one controller may be implemented within a processor, such as a microcontroller, a host processor, a host, a DSP, or a CPU, which can be integrated in a corresponding transceiver. Although the wireless communications system 100 is shown in FIG. 1 as including two Ext-Devs, other embodiments of the wireless communications system 100 may include one Ext-Dev or more than two Ext-Devs.

In one embodiment, when DUT1 104-1 is a DUT-uAP and DUT2 104-2 is a DUT-STA, Ext-Dev1 106-1 is an Ext-STA and Ext-Dev2 106-2 is an Ext-AP. In another embodiment, when DUT1 104-1 is a first DUT-uAP and DUT2 104-2 is a second DUT-uAP, Ext-Dev1 106-1 is a first Ext-STA and Ext-Dev2 106-2 is a second Ext-STA. As an example, an Ext-STA may be implemented in a laptop, a desktop personal computer (PC), a mobile phone, or other communications device that supports at least one WLAN communications protocol.

In the embodiment depicted in FIG. 1, the MAC 102 communicates using a first DUT channel, DUT1 channel 108-1, and a second DUT channel, DUT2 channel 108-2. For example, DUT1 104-1 communicates with Ext-Dev1 106-1 using the DUT1 channel 108-1, and DUT2 104-2 communicates with Ext-Dev2 106-2 using the DUT2 channel 108-2. In some embodiments, the DUT1 channel 108-1 may be in a same or different band as the DUT2 channel 108-2. In an embodiment, the DUT channels 108-1 and 108-2 may be BSS operating channels that feature multiple 20 MHz channels used to exchange frames (e.g., Date frames, Control frames, Management frames, Beacon frames, Action frames, etc.), for example, in Physical Layer Convergence Procedure (PLCP) Protocol Data Units (PP-DUs). The frames may be transmitted at signal bandwidths of, for example, 80 MHz, 160 MHz, or 320 MHz, and may include 20 MHz channels (sometimes referred to as "units"). In some embodiments, a 20 MHz channel may be a punctured 20 MHz channel (sometimes referred to as a "punctured channel" or a "punctured unit") or an unpunctured 20 MHz channel (sometimes referred to as an "unpunctured channel" or an "unpunctured unit). Although the MAC 102 communicates (e.g., wirelessly communicates) using DUT channels 108-1 and 108-2, in other embodiments, the MAC

102 may communicate (e.g., wirelessly communicate) via more than two channels or less than two channels.

In some embodiments, the MAC 102 may not be able to communicate on the DUT1 channel 108-1 and the DUT2 channel 108-2 simultaneously, such that the MAC 102 may (only) be able to communicate using one DUT channel at a time. As such, the MAC 102 may have to perform a handshake with Ext-Dev1 106-1 and Ext-Dev2 106-2 for channel switches between the DUT1 channel 108-1 and the DUT2 channel 108-2.

In some embodiments, the MAC 102 not be able to communicate on the DUT1 channel 108-1 and the DUT2 channel 108-2 simultaneously, such that the MAC 102 may (only) be able to communicate using one DUT channel at a time. As such, the MAC 102 may have to perform a handshake with Ext-Dev1 106-1 and Ext-Dev2 106-2 for channel switches between the DUT1 channel 108-1 and the DUT2 channel 108-2.

To perform a handshake at DUT1 104-1, DUT1 pauses transmission traffic and transmits a broadcast null frame to Ext-Dev1 106-1 using DUT1 channel 108-1. DUT1 104-1 then remains idle for a duration to receive pending response traffic from Ext-Dev1 106-1. After remaining idle for the duration, a channel switch occurs between DUT1 104-1 and DUT2 104-2. To perform a handshake at DUT2 104-2, DUT2 pauses transmission traffic and transmits a unicast Quality of Service (QOS) null frame (with power management (PM) equal to one) to Ext-Dev2 106-2 using DUT2 channel 108-2. DUT2 104-2 then remains idle for a duration to receive pending response traffic (e.g., an Acknowledgement (Ack) frame) from Ext-Dev2 106-2. Such handshakes may be repeated at DUT1 104-1 and DUT2 104-2 after each channel switch that occurs between DUT1 and DUT2. Consequently, performing the handshake for channel switches increases overhead, which may reduce channel utilization and frame exchange efficiency. Channel utilization efficiency may also be further reduced if a medium of the DUT channels is busy.

In accordance with an embodiment of the invention, a device includes a wireless network interface device implemented on one or more ICs, wherein the wireless network interface device is configured to negotiate a Target Wake Time (TWT) of a first DUT (DUT1) and a TWT of a second DUT (DUT2), and switch channels between DUT1 and DUT2 according to the negotiated TWT of DUT1 and the negotiated TWT of DUT2. By switching channels between DUT1 and DUT2 according to the negotiated TWT of DUT1 and the negotiated TWT of DUT2, wireless devices reduce overhead and improve latency during channel switching. As such, wireless communications systems may communicate more efficiently.

As described herein, "negotiate" may imply a first device (e.g., a DUT or an Ext-Dev) proposing a parameter or set of parameters to a second device (e.g., a DUT or an Ext-Dev), the second device rejecting and/or accepting some or all of the proposed parameter(s), and the second device indicating to the first device, the accepted parameter(s) from the proposed parameter(s). In some embodiments, the first device and the second device may perform several "negotiations" to establish the accepted parameter(s).

As described herein, a "DUT" (e.g., DUT1 and/or DUT2) may be included in a MAC device (e.g., a singular MAC device). As an example, a DUT may be a DUT-uAP or a DUT-STA. In such an example, a DUT-uAP exchanges frames with an Ext-STA, and a DUT-STA exchanges frames with an Ext-AP.

Examples of channel switching are described in further detail with reference to FIG. 2A and FIG. 2B.

Figure 2A:
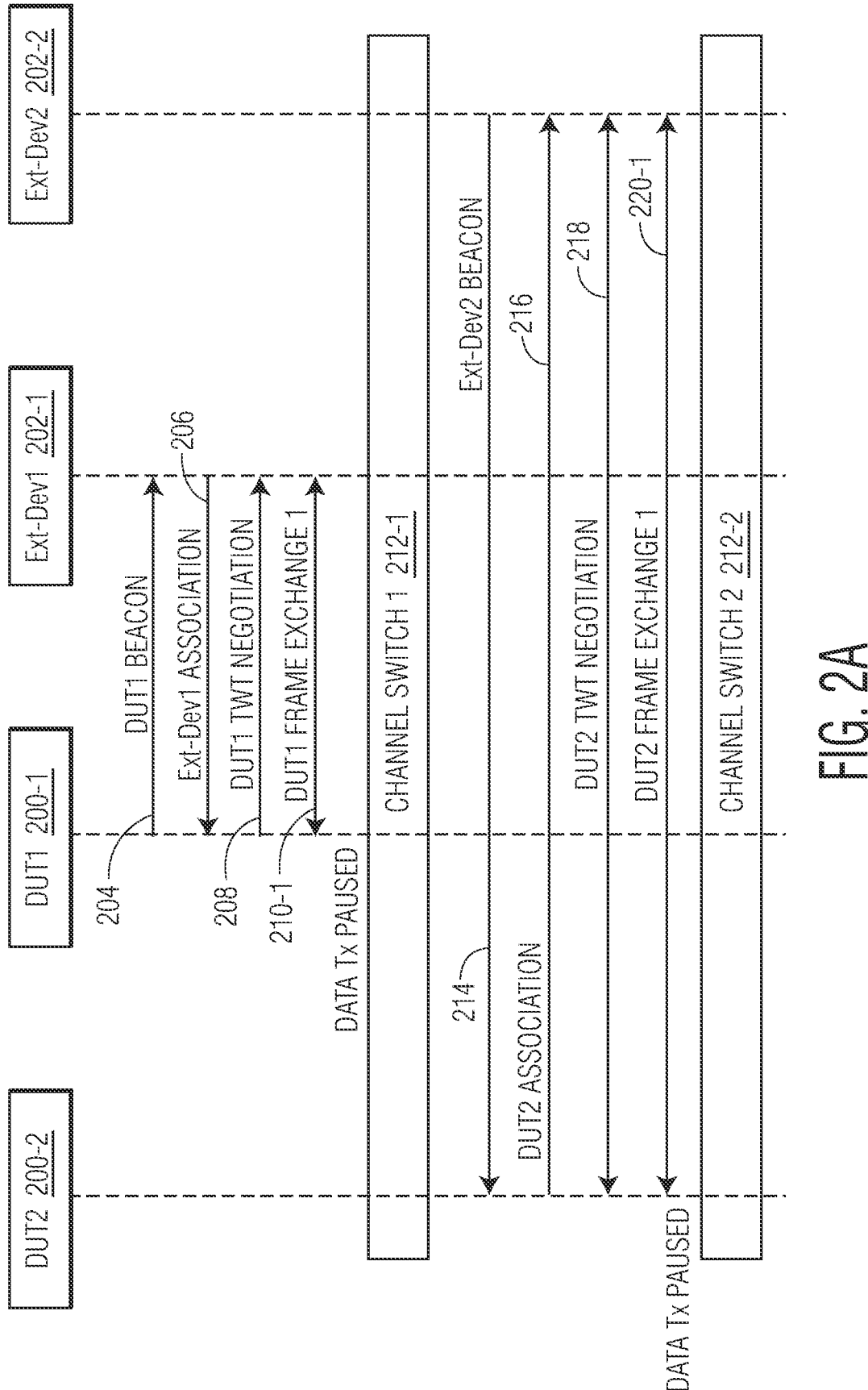
FIG. 2A illustrates an example of wireless communications during a Target Wake Time (TWT) negotiation phase.

FIG. 2A illustrates an example of wireless communications during a TWT negotiation phase. During the TWT negotiation phase, a first DUT, DUT1 200-1, and a second DUT, DUT2 200-2, communicate with a first external device, Ext-Dev1 202-1, and a second external device, Ext-Dev2 202-2, respectively. In an embodiment, DUT1 200-1 and DUT2 200-2 may be included in a singular MAC device (e.g., MAC 102 in FIG. 1). For example, DUT1 200-1 and DUT2 200-2 may be included in a single 802.11 MAC used for multiple BSSs, a single 802.11 MAC used for multiple Wi-Fi interfaces (e.g., soft AP, STA, and/or peer-to-peer (P2P), etc.), or in applications such as APPLE CARPLAY, ANDROID AUTO, or MIRACAST, which have multiple Wi-Fi interfaces operating on a single 802.11 MAC. In an embodiment, DUT1 200-1 is a DUT-uAP, DUT2 200-2 is a DUT-STA, Ext-Dev1 202-1 is an Ext-STA), and Ext-Dev2 202-2 is an Ext-AP). Although not shown, DUT1 200-1 communicates with Ext-Dev1 202-1 via a first DUT channel (e.g., DUT1 channel 108-1 in FIG. 1), and DUT2 200-2 communicates with Ext-Dev2 202-2 via a second DUT channel (e.g., DUT2 channel 108-2 in FIG. 1). The DUT1 channel and the DUT2 channel may be in the same or different band (e.g., 2.4 GHz band or 5 GHz band).

To associate with Ext-Dev1 202-1, DUT1 200-1 transmits a beacon, DUT1 beacon 204, to Ext-Dev1 202-1 using the DUT1 channel. After receiving the DUT1 beacon 204, Ext-Dev1 202-1 transmits an association message, Ext-Dev1 association message 206, to DUT1 200-1 using the DUT1 channel. The transmission and reception of the DUT1 beacon 204 and the Ext-Dev1 association message 206 establishes an association between DUT1 200-1 and Ext-Dev1 202-1, such that the association may represent a connection between the devices for further communications.

Once DUT1 200-1 and Ext-Dev1 202-1 are associated, a TWT negotiation of DUT1, DUT1 TWT negotiation 208, may be performed. In an embodiment, negotiating DUT1 TWT negotiation 208 involves DUT1 200-1 receiving a TWT request message (not shown) from Ext-Dev1 202-1, the TWT request message indicating requested TWT parameters. DUT1 200-1 determines whether to accept some or all of the requested TWT parameters and then transmits a TWT response message (not shown) to Ext-Dev1 202-1, the TWT response message indicating whether the requested TWT parameters were accepted.

In an embodiment, the TWT parameters of the negotiated TWT of DUT1 include a DUT1 TWT wake interval, a DUT1 TWT service period (SP), and a DUT1 sleep schedule. The DUT1 TWT wake interval may be predetermined wake periods during which DUT1 200-1 is in a "wake" mode and may exchange frames. The DUT1 TWT SP may be predetermined frame exchange periods within the DUT1 TWT wake interval, and during which DUT1 200-1 is able to transmit and receive frames. The DUT1 sleep schedule may be predetermined sleep periods during which DUT1 200-1 is in a "sleep" mode and may not exchange frames.

Once the accepted TWT parameters are established, DUT1 200-1 exchange frames on the DUT1 channel with Ext-Dev1 202-1 and switches channels according to the negotiated TWT of DUT1. In an embodiment, DUT1 200-1 exchanges frames in a first frame exchange, DUT1 frame exchange 1 210-1, with Ext-Dev1 202-1 on the DUT1 channel according to the negotiated TWT of DUT1. DUT1 frame exchange 1 210-1 may occur within the DUT1 TWT SP and the DUT1 TWT wake interval of the negotiated TWT of DUT1. After DUT1 frame exchange 1 210-1, a data transmission pause (shown by "Data Tx Pause") occurs before a first channel switch, channel switch 1 212-1. As an example, the data transmission pause may be a duration greater than fifty microseconds. During channel switch 1 212-1, a channel switch occurs between DUT1 200-1 and DUT2 200-2, such that the channel switch involves switching from the DUT1 channel to the DUT2 channel. In an embodiment, DUT1 200-1 enters a "sleep" mode before channel switch 1 212-1.

After channel switch 1 212-1, Ext-Dev2 202-2 transmits a beacon, Ext-Dev2 beacon 214, to DUT2 200-2 using the DUT2 channel. After receiving the Ext-Dev2 beacon 214, DUT2 200-2 transmits an association message, DUT2 association message 216, to Ext-Dev2 202-2 using the DUT2 channel. The transmission and reception of the Ext-Dev2 beacon 214 and the DUT2 association message 216 establishes an association between DUT2 200-2 and Ext-Dev2 202-2, such that the association may represent a connection between the devices for further communications.

Once DUT2 200-2 and Ext-Dev2 202-2 are associated, a TWT negotiation of DUT2, DUT2 TWT negotiation 218, may be performed. In an embodiment, negotiating DUT2 TWT negotiation 218 involves DUT2 200-2 transmitting a TWT request message (not shown) to Ext-Dev2 202-2, the TWT request message indicating requested TWT parameters. Ext-Dev2 202-2 determines whether to accept some or all of the requested TWT parameters and then transmits a TWT response message (not shown) to DUT2 200-2, the TWT response message indicating whether the requested TWT parameters were accepted.

Once the accepted TWT parameters are established, DUT2 200-2 exchange frames on the DUT2 channel with Ext-Dev2 202-2 and switches channels according to the negotiated TWT of DUT2. In an embodiment, DUT2 200-2 exchanges frames in a first frame exchange, DUT2 frame exchange 1 220-1, with Ext-Dev2 202-2 on the DUT2 channel according to the negotiated TWT of DUT2. DUT2 frame exchange 1 220-1 may occur within the DUT2 TWT SP and the DUT2 TWT wake interval of the negotiated TWT of DUT2. After DUT2 frame exchange 1 220-1, a data transmission pause (shown by "Data Tx Pause") occurs before a second channel switch, channel switch 2 212-2. During channel switch 2 212-2, a channel switch occurs between DUT1 200-1 and DUT2 200-2, such that the channel switch involves switching from the DUT2 channel to the DUT1 channel. In an embodiment, DUT2 200-2 enters a "sleep" mode before channel switch 2 212-2.

Figure 2B:
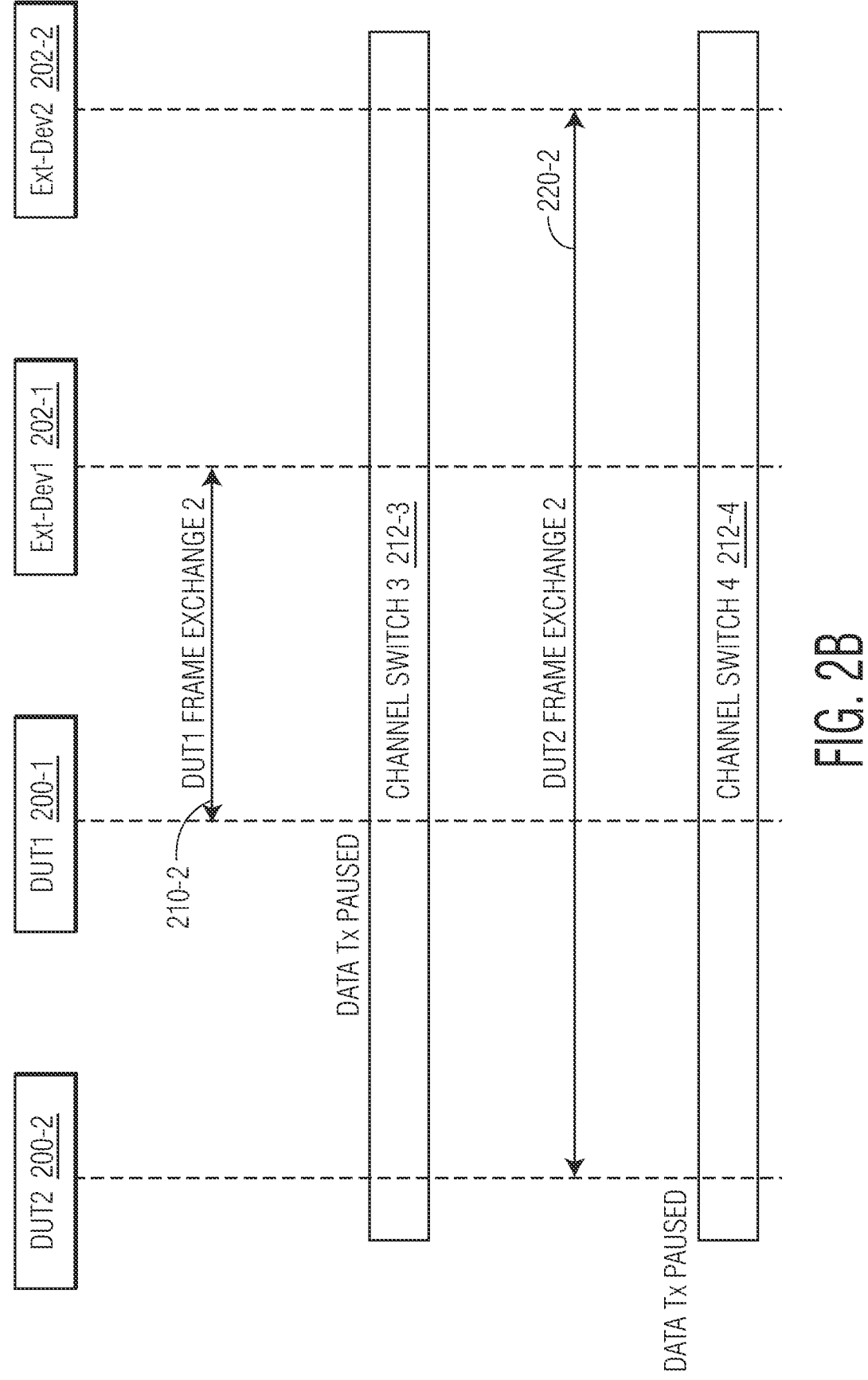
FIG. 2B illustrates an example of wireless communications after the TWT negotiation phase of FIG. 2A.

FIG. 2B illustrates an example of wireless communications after the TWT negotiation phase of FIG. 2A. In particular, FIG. 2B illustrates wireless communication after establishing the negotiated TWT of DUT1 and the negotiated TWT of DUT2.

In an embodiment, after channel switch 2 212-2 (FIG. 2A), DUT1 200-1 exchanges frames in a second frame exchange, DUT1 frame exchange 2 210-2, with Ext-Dev1 202-1 on the DUT1 channel according to the negotiated TWT of DUT1. DUT1 frame exchange 2 210-2 may occur within the DUT1 TWT SP and the DUT1 TWT wake interval of the negotiated TWT of DUT1. After DUT1 frame exchange 2 210-2, another data transmission pause (shown by "Data Tx Pause") occurs before a third channel switch, channel switch 3 212-3. During channel switch 3 212-3, another channel switch occurs between DUT1 200-1 and DUT2 200-2, such that the channel switch involves switching from the DUT1 channel to the DUT2 channel. In an embodiment, DUT1 200-1 enters a "sleep" mode before channel switch 3 212-3.

In an embodiment, after channel switch 3 212-3, DUT2 200-2 exchanges frames in a second frame exchange, DUT2 frame exchange 2 220-2, with Ext-Dev2 202-2 on the DUT2 channel according to the negotiated TWT of DUT2. DUT2 frame exchange 2 220-2 may occur within the DUT2 TWT SP and the DUT2 TWT wake interval of the negotiated TWT of DUT2. After DUT2 frame exchange 2 220-2, another data transmission pause (shown by "Data Tx Pause") occurs before a fourth channel switch, channel switch 4 212-4. During channel switch 4 212-4, another channel switch occurs between DUT1 200-1 and DUT2 200-2, such that the channel switch involves switching from the DUT2 channel to the DUT1 channel. In an embodiment, DUT2 200-2 enters a "sleep" mode before channel switch 4 212-4.

With reference to FIGS. 2A and 2B, the DUT1 TWT wake interval of the negotiated TWT of DUT1 and the DUT2 TWT wake interval of the negotiated TWT of DUT2 do not overlap. In an embodiment, the DUT1 TWT wake interval of the negotiated TWT of DUT1 and the DUT2 TWT wake interval of the negotiated TWT of DUT2 alternate according to the channel switches between DUT1 200-1 and DUT2 200-2. In such an embodiment, switching the channels between DUT1 and DUT2 involves switching the channels between the DUT1 TWT wake interval of the negotiated TWT of DUT1 and the DUT2 TWT wake interval of the negotiated TWT of DUT2. As such, DUT2 200-2 may be in a "sleep" mode while DUT1 200-1 is exchanging frames on the DUT1 channel during the DUT1 TWT SP, and DUT1 200-1 may be in a "sleep" mode while DUT2 200-2 is exchanging frames on the DUT2 channel during the DUT2 TWT SP. In some embodiments, the negotiated TWT of DUT1 and/or the negotiated TWT of DUT2 are an individual TWT (I-TWT), a broadcast TWT (B-TWT), and/or a restricted TWT (R-TWT). By switching channels according to the negotiated TWT of DUT1 and the negotiated TWT of DUT2, DUT1 200-1 and/or DUT2 200-2 may not need to perform a handshake for each channel switch.

The technique for channel switching as described with reference to FIGS. 2A and 2B may be beneficial in low latency applications (e.g., automotive applications and Internet of things (IOT) applications). Single MAC devices that implement the technique for channel switching may help support such applications by efficiently switching between BSSs operating on different frequencies. Further, the technique for channel switching helps improve latency by establishing a negotiated time for each BSS operating on different frequencies and between multiple clients within a BSS to reduce congestion, and by avoiding handshaking overhead when entering and leaving each BSS. The technique for channel switching also helps increase efficiency in wireless communications by allowing applications to have a guaranteed period for data exchange (e.g., average latency and latency jitter) between channel switches. As such, air bandwidth used for application traffic exchange may be improved.

An example of channel switching at a device is described in further detail with reference to FIG. 3.

Figure 3:
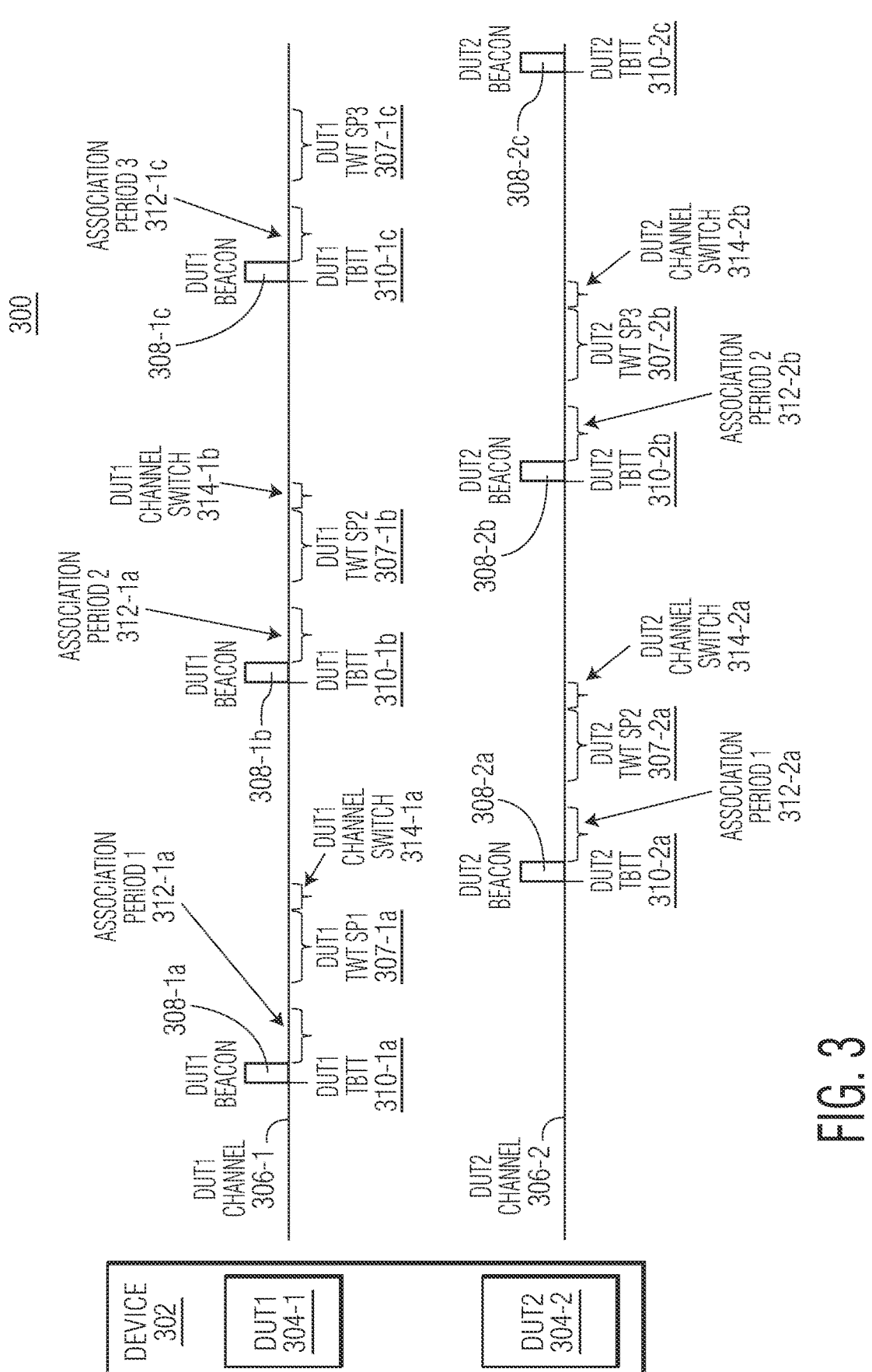
FIG. 3 illustrates an example of wireless communications at device.

FIG. 3 illustrates an example of wireless communications at a device 302. In an embodiment, the device 302 includes a first DUT, DUT1 304-1, and a second DUT, DUT2 304-2. In such an embodiment, the device 302 may be a uAP device, DUT1 304-1 may be a first DUT-uAP (DUT-uAP1), and DUT2 304-2 may be a second DUT-uAP (DUT-uAP2). DUT1 304-1 communicates on DUT1 channel 306-1 and DUT2 304-2 communicates on DUT2 channel 306-2. The DUT1 channel 306-1 and the DUT2 channel 306-2 may be in a same band or a different band (e.g., 2.4 GHz band, 5

GHz band, or 6 GHz band). Although not shown, DUT1 304-1 may be connected to a first Ext-STA (Ext-STA1) via the DUT1 channel 306-1, and DUT2 304-2 may be connected to a second Ext-STA (Ext-STA2) via the DUT2 channel 306-2.

In an embodiment, DUT1 304-1 transmits three beacons, DUT1 beacon 308-1a, DUT1 beacon 308-1b, and DUT1 beacon 308-1c on the DUT1 channel 306-1 to Ext-STA1. DUT1 beacon 308-1a is transmitted at a first DUT1 Target Beacon Transmission Time (TBTT), DUT1 TBTT 310-1a, DUT1 beacon 308-1b is transmitted at a second DUT1 TBTT, DUT1 TBTT 310-1b, and DUT1 beacon 308-1c is transmitted at a third DUT1 TBTT, DUT1 TBTT 310-1c. There is an association period after each beacon is transmitted, implemented as association period 1 312-1a, association period 2 312-1b, and association period 3 312-1c. After each association period there is a DUT1 TWT SP, implemented as DUT1 TWT SP1 307-1a, DUT1 TWT SP2 307-1b, and DUT1 TWT SP3 307-1c. A first DUT1 channel switch, DUT1 channel switch 314-1a, occurs after the DUT1 TWT SP1 307-1a, and a second DUT1 channel switch, DUT1 channel switch 314-1b occurs after the DUT1 TWT SP2 307-1b.

In an embodiment, DUT2 304-2 transmits three beacons, DUT2 beacon 308-2a, DUT2 beacon 308-2b, and DUT2 beacon 308-2c on the DUT2 channel 306-2 to Ext-STA2. DUT2 beacon 308-2a is transmitted at a first DUT2 TBTT, DUT2 TBTT 310-2a, DUT2 beacon 308-2b is transmitted at a second DUT2 TBTT, DUT2 TBTT 310-2b, and DUT2 beacon 308-2c is transmitted at a third DUT2 TBTT, DUT2 TBTT 310-2c. There is an association period after the transmission of beacons 308-2a and 308-2b, implemented as association period 1 312-2a and association period 2 312-2b. After each association period there is a DUT2 TWT SP, implemented as DUT2 TWT SP1 307-2a and DUT2 TWT SP2 307-2b. A first DUT2 channel switch, DUT2 channel switch 314-2a, occurs after the DUT2 TWT SP1 307-2a, and a second DUT2 channel switch, DUT2 channel switch 314-2b, occurs after the DUT2 TWT SP2 307-2b.

In one embodiment, when different DUTs (e.g., DUT1 304-1 and/or DUT2 304-2) receive individual TWT setup requests (e.g., TWT request messages) from associated STAs, the DUT(s) set up individual TWT SPs that do not have an overlap in time domain, i.e., individual TWT SPs of DUT1 do not overlap with broadcast TWT SPs of DUT2 in time domain. In another embodiment, when different DUTs (e.g., DUT1 304-1 and/or DUT2 304-2) announce broadcast TWT SPs, the broadcast TWT SPs of one DUT does not overlap with broadcast TWT SPs of another DUT.

With reference to FIG. 3, the TBTTs of DUT1 304-1 and DUT2 304-2 do not overlap with each other. In some embodiments, DUT1 304-1 and/or DUT2 304-2 allocates a period of time within a beacon interval for STA association. The period of time may be announced by a beacon, after a beacon transmission with an interval of at least one beacon interval, or defined by a TWT agreement. Additionally, the period of time used for association may be a predetermined time after a beacon is transmitted.

In some embodiments, DUT1 304-1 may be a first DUT-STA (DUT-STA1) and DUT2 304-2 may be a second DUT-STA (DUT-STA2), such that DUT-STA1 and DUT-STA2 may both be included in a single MAC device (e.g., STA device). In such an embodiment, DUT-STA1 exchanges frames with a first Ext-AP (Ext-AP1) on a DUT1 channel (e.g., DUT1 channel 306-1), and DUT-STA2 exchanges frames with a second Ext-AP (Ext-AP2) on a DUT2 channel (e.g., DUT2 channel 306-2). DUT-STA1 exchanges frames with Ext-AP1 on the DUT1 channel according to a negoti-ated TWT of DUT-STA1. DUT-STA2 exchanges frames with Ext-AP2 on the DUT1 channel according to a negoti-ated TWT of DUT-STA2.

An example of a wireless network interface device is described in further detail with reference to FIG. 4.

Figure 4:
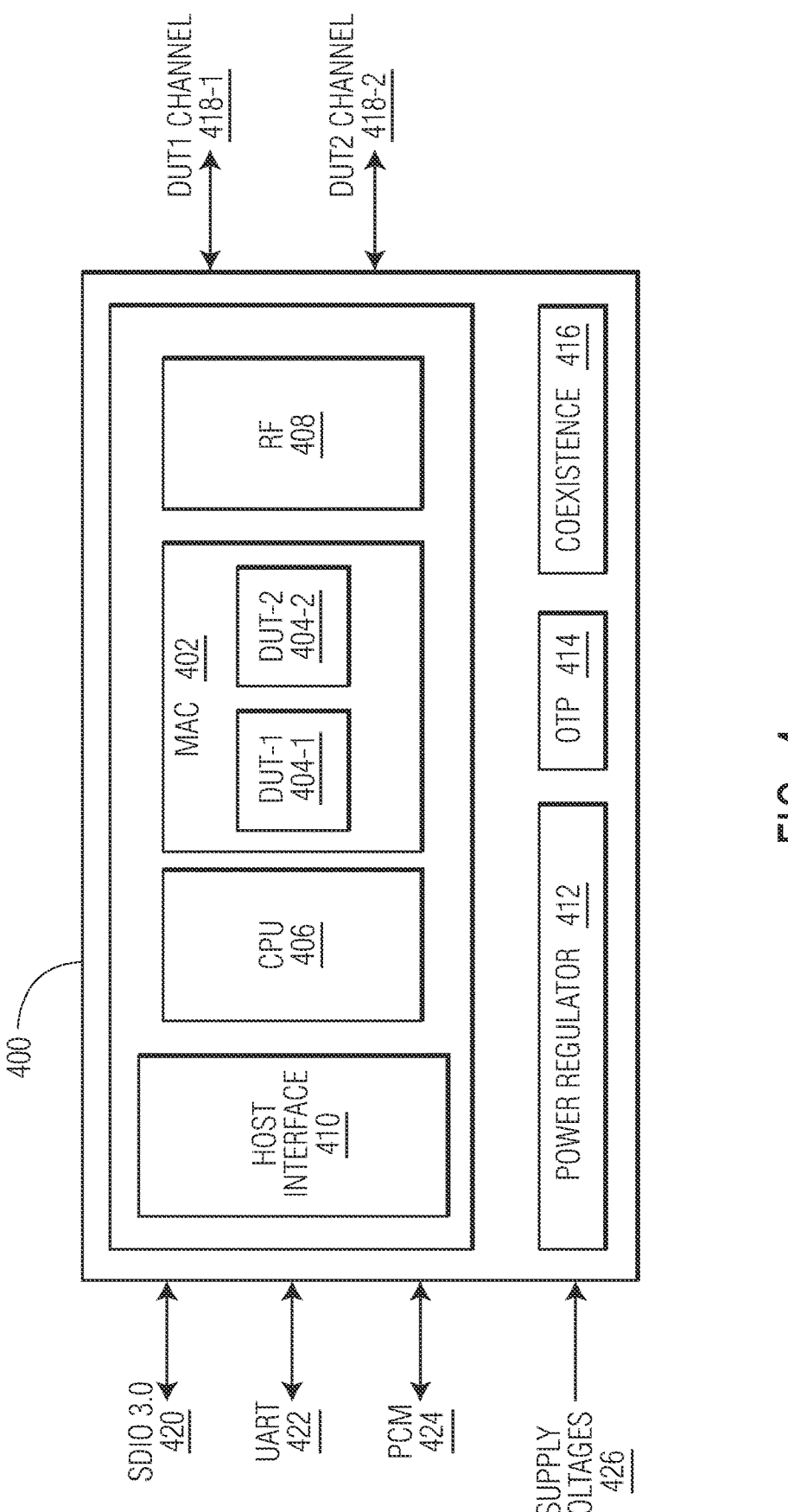
FIG. 4 depicts an example of a wireless network interface device.

FIG. 4 depicts an example of a wireless network interface device 400. In particular, the wireless network interface device 400 includes a MAC 402 with a first DUT, DUT1 404-1, and a second DUT, DUT2 404-2, a CPU 406, a radio-frequency (RF) module 408, a host interface 410, a power regulator 412, a One-Time-Programmable (OTP) memory 414, and a coexistence 416. In an embodiment, the wireless network interface device 400 is embodied as a standalone integrated circuit (IC) device. In an embodiment, the MAC 402, DUT1 404-1, and DUT2 404-2 may be as described with reference to FIG. 1.

The CPU 406 may be configured to process information and/or frames exchanged by DUT1 404-1 and/or DUT2 404-2. In some embodiments, the CPU 406 controls the channel switching between DUT1 404-1 and DUT2 404-2.

The RF module 408 may be configured to transmit and receive data (e.g., exchange frames) with external devices (e.g., Ext-Dev1 106-1 and/or Ext-Dev2 106-2 in FIG. 1). In an embodiment, the RF module 408 may be configured to exchange frames with the external devices using a first DUT channel, DUT1 channel 418-1, and a second DUT channel, DUT2 channel 418-2. As an example, the DUT1 channel 418-1 is used for frame exchanges between DUT1 404-1 and a first external device, and the DUT2 channel 418-2 is used for frame exchanges between DUT2 404-2 and a second external device.

The host interface 410 may be configured to support a serial digital input/output (SDIO) 3.0 420, a universal asyn-chronous receiver-transmitter (UART) 422, and/or a pulse-code modulation (PCM) 424. The SDIO 3.0 420 may be a type of secure digital card interface that can be used as an interface for input devices and/or output devices. The UART 422 may be a device for asynchronous serial communication in which data format and transmission speeds are configur-able. The PCM 424 may be an interface used to digitally represent analog signals. In an embodiment, the host inter-face includes a physical interface on the exterior of the corresponding IC device.

The power regulator 412 may be configured to interface with supply voltages 426 through a corresponding power interface on the IC device. In an embodiment, the power regulator 412 regulates the power of the wireless interface device 400.

The OTP memory 414 may be configured to store instruc-tions to be implemented by the wireless network interface device 400. In an embodiment, the OTP memory 414 may be a non-volatile memory (NVM) that permits computer readable instructions to be written to the OTP 414 once. As such, the instructions are retained even if power is lost.

The coexistence 416 may be configured to enabled shared use of an antenna or wireless spectrum (e.g., by Bluetooth, Wi-Fi, and/or Long-Term Evolution (LTE)).

Figure 5:
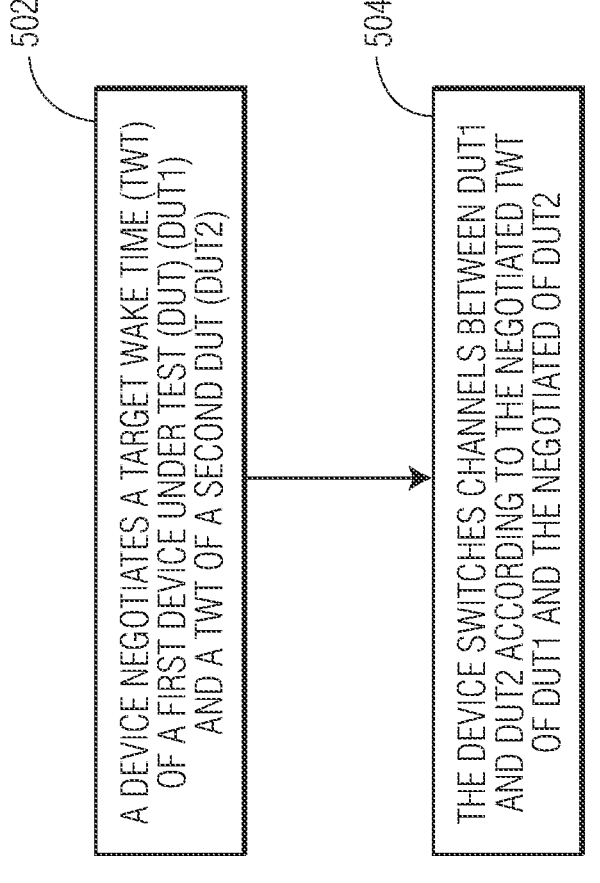
FIG. 5 illustrates a flow diagram of a technique for channel switching in accordance with an embodiment of the invention.

FIG. 5 illustrates a flow diagram of a technique for channel switching in accordance with an embodiment of the invention. At block 502, a device that includes a wireless network interface device negotiates a TWT of DUT1 and a TWT of DUT2. At block 504, the device switches channels between DUT1 and DUT2 according to the negotiated TWT of DUT1 and the negotiated TWT of DUT2.

In some embodiments, the technique for channel switch-ing includes negotiating a TWT of DUT1 and a TWT of DUT2, and switching channels between DUT1 and DUT2 according to the negotiated TWT of DUT1 and the negoti-ated TWT of DUT2.

In some embodiments, the technique for channel switch-ing may be implemented by a system. For example, a system includes a DUT1 configured to negotiate a TWT of DUT1, and a DUT2 configured to negotiate a TWT of DUT2, and where channel switching between DUT1 and DUT2 occurs according to the negotiated TWT of DUT1 and the negoti-ated TWT of DUT2.

Figure 6:
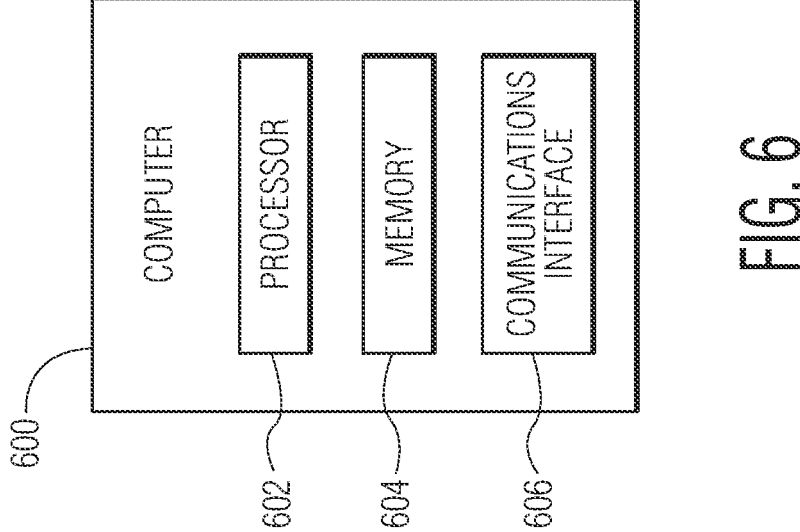
FIG. 6 depicts an example of a computer that can implement the technique for channel switching as described with reference to FIG. 5.

In an embodiment, the above-described functionality is performed at least in part by a computer or computers, which executes computer readable instructions. FIG. 6 depicts an example of a computer 600 that can implement the tech-nique for channel switching as described herein with refer-ence to FIG. 5. As shown, the computer 600 includes a processor 602, a memory 604, and a communications inter-face 606. The processor may include a multifunction pro-cessor and/or an application-specific processor. As an example, the processor could be a CPU (with software), an application-specific integrated circuit (ASIC), a transceiver, a radio, or a combination thereof. The memory within the computer may include, for example, storage medium such as read only memory (ROM), flash memory, random-access memory (RAM), and a large capacity permanent storage device such as a hard disk drive. The communications interface enables communications with other computers via, for example, the Internet Protocol (IP). The computer executes computer readable instructions stored in the storage medium to implement various tasks as described above.

As an example, the computer 600 may represent a wire-less device. In such an example, the wireless device includes a wireless network interface device implemented on one or more ICs. As an example, the wireless network interface device may include or connect to antennas, processors, batteries, storage mediums, etc., and may be configured to perform wireless operations and/or communications.

Although the operations of the method(s) herein are shown and described in a particular order, the order of the operations of each method may be altered so that certain operations may be performed in an inverse order or so that certain operations may be performed, at least in part, con-currently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromag-netic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc. Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A device comprising:
a wireless network interface device implemented on one or more integrated circuits (ICs), wherein the wireless network interface device is configured to:
    negotiate a Target Wake Time (TWT) of a first Device Under Test (DUT) (DUT1) and a TWT of a second DUT (DUT2); and
    switch channels between the DUT1 and the DUT2 according to the negotiated TWT of the DUT1 and the negotiated TWT of the DUT2, wherein at least one of the DUT1 or the DUT2 allocates a period of time within a beacon interval for association with an external device, and wherein the period of time is at least one of:
      announced by a beacon;
      following a beacon transmission with an interval of at least one beacon interval; or
      defined by a TWT agreement.

2. The device of claim 1, wherein a DUT1 TWT wake interval of the negotiated TWT of the DUT1 and a DUT2 TWT wake interval of the negotiated TWT of the DUT2 do not overlap.

3. The device of claim 1, wherein switching channels between the DUT1 and the DUT2 involves:
    switching channels between a DUT1 TWT wake interval of the negotiated TWT of the DUT1 and a DUT2 TWT wake interval of the negotiated TWT of the DUT2.

4. The device of claim 1, wherein switching channels between the DUT1 and the DUT2 involves:
    switching from a DUT1 channel to a DUT2 channel;
    wherein the DUT1 exchanges frames on the DUT1 channel according to the negotiated TWT of the DUT1; and
    wherein the DUT2 exchanges frames on the DUT2 channel according to the negotiated TWT of the DUT2.

5. The device of claim 1, wherein switching channels between the DUT1 and the DUT2 involves:
    switching from a DUT2 channel to a DUT1 channel;
    wherein the DUT1 exchanges frames on the DUT1 channel according to the negotiated TWT of the DUT1; and
    wherein the DUT2 exchanges frames on the DUT2 channel according to the negotiated TWT of the DUT2.

6. The device of claim 1, wherein switching channels between the DUT1 and the DUT2 involves switching between channels in a same band.

7. The device of claim 1, wherein switching channels between the DUT1 and the DUT2 involves switching between channels in different bands.

8. The device of claim 1, wherein a data transmission pause occurs before switching channels between the DUT1 and the DUT2.

9. The device of claim 1, wherein:
    the DUT1 exchanges frames on a DUT1 channel with an external station (STA) (Ext-STA) according to the negotiated TWT of the DUT1; and
    the DUT2 exchanges frames on a DUT2 channel with an external access point (AP) (Ext-AP) according to the negotiated TWT of the DUT2.

10. The device of claim 1, wherein:
    the DUT1 exchanges frames on a DUT1 channel with a first Ext-STA (Ext-STA1) according to the negotiated TWT of the DUT1; and
    the DUT2 exchanges frames on a DUT2 channel with a second Ext-STA (Ext-STA2) according to the negotiated TWT of the DUT2.

11. The device of claim 1, wherein:
    the DUT1 is a DUT soft AP (uAP) (DUT-uAP); and
    the DUT2 is a DUT STA (DUT-STA).

12. The device of claim 1, wherein:
    the DUT1 is a first DUT-STA (DUT-STA1); and
    the DUT2 is a second DUT-STA (DUT-STA2).

13. The device of claim 1, wherein:
    the DUT1 is a first DUT-uAP (DUT-uAP1); and
    the DUT2 is a second DUT-uAP (DUT-uAP2).

14. The device of claim 13, wherein at least one of the DUT-uAP1 or the DUT-uAP2 allocates the period of time within a beacon interval for STA association.

15. The device of claim 1, wherein the DUT1 is a DUT-uAP, and wherein negotiating the TWT of the DUT1 includes:
    receiving a TWT request message indicating requested TWT parameters;
    determining whether to accept the requested TWT parameters; and
    transmitting a TWT response message indicating whether the requested TWT parameters were accepted.

16. The device of claim 1, wherein the DUT2 is a DUT-STA, and wherein negotiating the TWT of the DUT2 includes:
    transmitting a TWT request message indicating requested TWT parameters; and
    receiving a TWT response message indicating whether the requested TWT parameters were accepted.

17. The device of claim 1, wherein the negotiated TWT of the DUT1 and the negotiated TWT of the DUT2 are at least one of:
    an individual TWT (I-TWT);
    a broadcast TWT (B-TWT); or
    a restricted TWT (R-TWT).

18. A method for channel switching, the method comprising:
    negotiating a Target Wake Time (TWT) of a first Device Under Test (DUT) (DUT1) and a TWT of a second DUT (DUT2); and
    switching channels between the DUT1 and the DUT2 according to the negotiated TWT of the DUT1 and the negotiated TWT of the DUT2, wherein at least one of the DUT1 or the DUT2 allocates a period of time within a beacon interval for association with an external device, and wherein the period of time is at least one of:
      announced by a beacon;
      following a beacon transmission with an interval of at least one beacon interval; or
      defined by a TWT agreement.

19. A system comprising:
    a first Device Under Test (DUT) (DUT1) configured to negotiate a Target Wake Time (TWT) of the DUT1;
    a second DUT (DUT2) configured to negotiate a TWT of the DUT2; and
    wherein channel switching between the DUT1 and the DUT2 occurs according to the negotiated TWT of the DUT1 and the negotiated TWT of the DUT2 and at least one of the DUT1 or the DUT2 allocates a period of time within a beacon interval for association with an external device, and wherein the period of time is at least one of:

announced by a beacon;

following a beacon transmission with an interval of at least one beacon interval; or defined by a TWT agreement.

* * * * *